US008290542B2

(12) United States Patent  
Gosselin

(10) Patent No.: US 8,290,542 B2  
(45) Date of Patent: Oct. 16, 2012

(54) SYSTEMS AND METHODS FOR IMPROVED CONTENT DELIVERY TO MOBILE COMMUNICATION DEVICES

(75) Inventor: Mark Gosselin, Seattle, WA (US)

(73) Assignee: Cequint, Inc., Seattle, WA (US)

( * ) Notice: Subject to any disclaimer, the term of this patent is extended or adjusted under 35 U.S.C. 154(b) by 237 days.

(21) Appl. No.: 12/723,518

(22) Filed: Mar. 12, 2010

(65) Prior Publication Data

US 2011/0223944 A1 Sep. 15, 2011

(51) Int. Cl.  
*H04W 4/12* (2009.01)

(52) U.S. Cl. ........................ 455/567; 455/420

(58) Field of Classification Search .................. 455/411, 455/420, 566, 567  
See application file for complete search history.

(56) References Cited

U.S. PATENT DOCUMENTS

2008/0039063 A1\* 2/2008 Ichieda .......................... 455/420  
2010/0073387 A1\* 3/2010 Jani et al. ....................... 345/557

OTHER PUBLICATIONS

"Mobile Messaging Network Application Handbook," www.tekelec.com/resource-center, 1 page, printed Jul. 7, 2010.  
"Mobile Advertising Creating New Revenue Opportunities with SMS-Based Advertising," www.telec.com pp. 9, printed Jul. 7, 2010; copyright 2008, 2009.

\* cited by examiner

*Primary Examiner* — Sam Bhattacharya  
(74) *Attorney, Agent, or Firm* — Lowe Graham Jones, PLLC

(57) ABSTRACT

Systems and methods for improving information delivery to mobile devices. In an exemplary method a trigger is generated at a mobile device based on an experienced event, the trigger is sent to a network server from the mobile device, a message including content being associated with the trigger is generated upon receipt of the trigger, the message is sent to the mobile device, the message is received at the mobile device from the server, and content included in the received message is displayed on a display of the mobile device.

22 Claims, 2 Drawing Sheets

SYSTEMS AND METHODS FOR IMPROVED CONTENT DELIVERY TO MOBILE COMMUNICATION DEVICES

BACKGROUND OF THE INVENTION

Direct contact to mobile system subscribers is an important method for third-party and carrier-based promotions directed to potential customers for additional services and software for their mobile devices (used herein interchangeably with "mobile handset"). Currently, such promotions have certain limitations in practice. Promotional messages are of limited length, are text-only, and are processed and stored in the mobile device's Short Message Service (SMS) inbox. Richer content associated with the promotions may be referenced using Internet Uniform Resource Locators (URLs), but such links have to be re-typed by the subscriber in order to reach the associated Web pages on the Internet. Similarly, pictures, images or sound may be delivered as content using Multimedia Message Service (MMS). MMS is limited in that MMS provides for immediate content delivery, and is not trigger-based. MMS also provides no feedback mechanism from users, such as in providing interactive or dynamic buttons on a display screen, only providing delivery of content. MIMS is also restricted as to its ability to combine types of content in the display—such as text and a picture—and has no uniform method to put them together in the presentation on a particular device, as it is very dependent on methods adapted to a specific handset and display type.

One current disadvantage of text-based SMS (or MMS) promotional campaigns is the uncertainty around the delivery time. While most SMS messages are delivered within a matter of seconds, mass SMS campaigns can suffer from traffic constraints at the Short Message Service Center (SMSC), or experience widespread delay because of the subscribers' handsets being turned off, or face time-of-delivery constraints (e.g., shortened period for sending across the U.S. to reach all time zones, 12 p.m. to 6 p.m. EST, reaching users on PST from 9 a.m. to 3 p.m., to avoid sending when subscribers in the spectrum of time zones are not in work hours) because the time zone of receiving handsets is unknown. This can lead to messages being delivered in a very limited range of hours, or at unacceptable hours, or require unwanted padding around the targeted delivery time.

It would be advantageous, therefore, to be able to deliver content when a subscriber is active on their mobile device (or handset), thus able to immediately view the message or advertising, as well as to target or personalize the content to be delivered based on the subscriber, their activity on the mobile handset, or activity or location of the mobile handset. It would also be advantageous to deliver and store such messages on the mobile handset independent of the trigger events or display of the message content, asynchronously.

SUMMARY OF THE INVENTION

The present invention provides systems and methods for improving information delivery to mobile devices. In an exemplary method a trigger condition (referred to interchangeably as "trigger" or "display condition") is specified on the mobile device. A message is delivered to the handset via SMS (referred to interchangeably as "content" or "content message"). While the message may be the text-only contents of an SMS message, it is possible to provide for richer content, the SMS message may contain a URL, allowing the mobile device to retrieve and store additional content from a content server. Note that the content message may be comprised of plain text, of rich content with images, layout and text, audio and video, of a source identifier for the content, such as a file, URL, database query result, cache or memory location, or any other means for specifying the content to be retrieved and shown. A specialized form of markup language for specifying content for display on mobile devices called Intelligent Display Markup Language, or IDML, may be used. Finally, when a trigger condition occurs, stored content associated with that trigger is shown on a display of the mobile device.

In one aspect of the invention, the content comprises information personalized to at least one of the parties included in a call event or information identifying at least one of the parties included in a call event.

In another aspect of the invention, the displaying of content occurs in response to a trigger based on a user action on the mobile handset.

In still another aspect of the invention, the content associated with the stored message includes text, graphics, audio, video, a user action, or an interactive user interface object. The content may be used for communication with a subscriber from a carrier (e.g., on account status information, minutes used, etc.) or for advertising purposes.

In yet another aspect of this invention, the content may be displayed in combination with carrier termination of and timing of an incoming or outgoing call on the mobile handset. In yet another aspect of the invention, generating the display is performed based on at least one of a call initiation event, receive call page event, end-of-call event, or a call termination event. In a related aspect of the invention, the displaying of content occurs in response to a user action, or during a call, or at the end of a call, as in response to a call initiation event, a call page event, an inbound call termination event, or an end-of-call event. In addition, the invention may combine, where desirable, the request, retrieval and display of the content message with the request, retrieval, evaluation and display of caller identification information from other services, of targeted content, or of personalized content. Some triggers will be based on events that can be registered on the mobile device, such as actions that occur when there is an incoming call event. In one example, a trigger can display content from the stored message cache when there is a specific MDN match to an incoming phone number. Other triggers may be polling-based, such as taking a GPS location on a repeating time cycle and determining whether any of the stored content should be displayed based on proximity to the current location of the mobile device.

In still yet another aspect of the invention, sending the content includes using at least one of a short message service (SMS), a port-directed or application-directed SMS, or a session initiated protocol (SIP) and receiving includes receiving the content message using at least one of a short message service (SMS), a port-directed or application-directed SMS, MMS, or session-initiated protocol (SIP). Other methods for initiating communications with an individual client device or handset from a server may also be used, without limitation.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
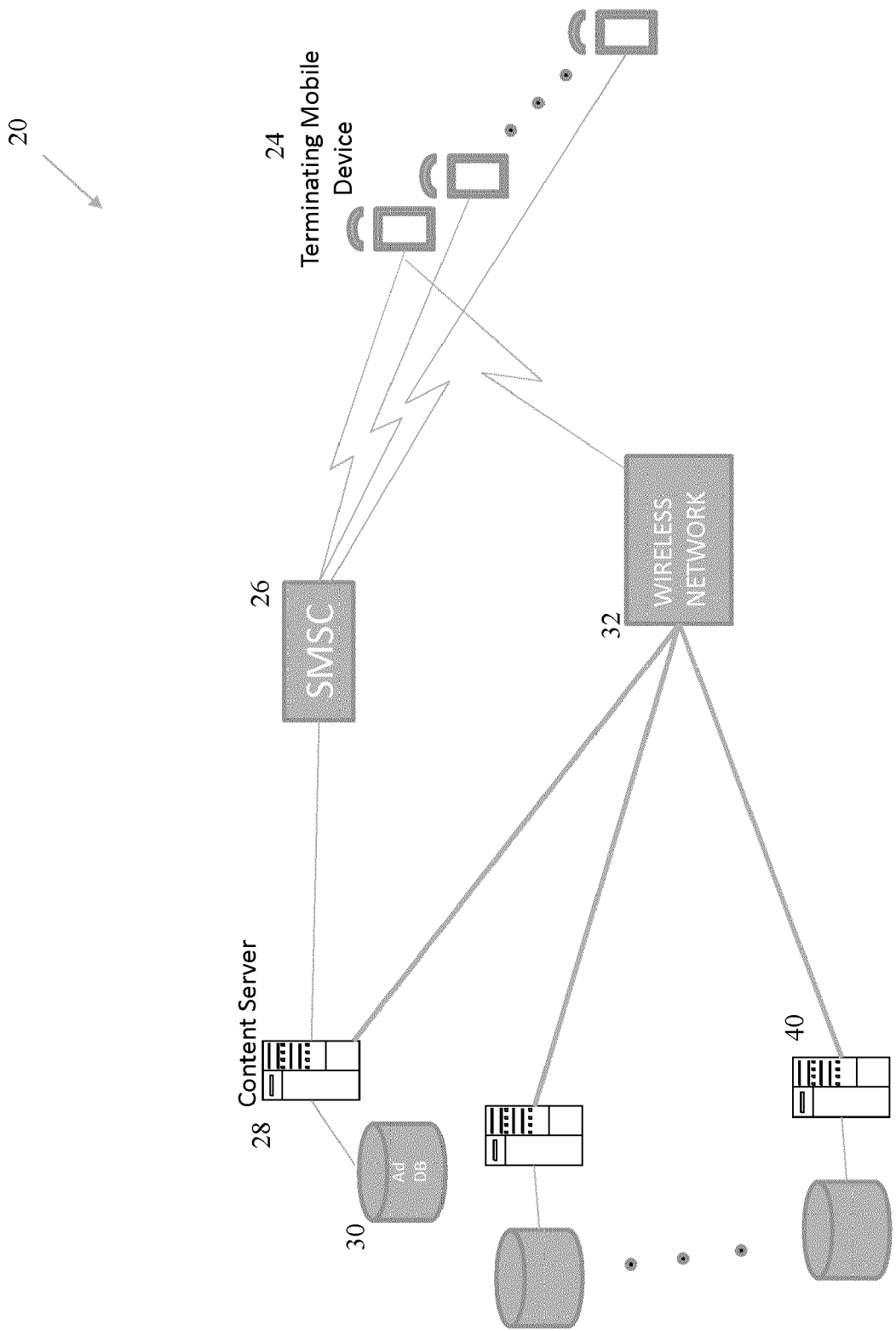
FIG. 1 illustrates an exemplary system configured to perform processes according to embodiments of the present invention.
Figure 2:
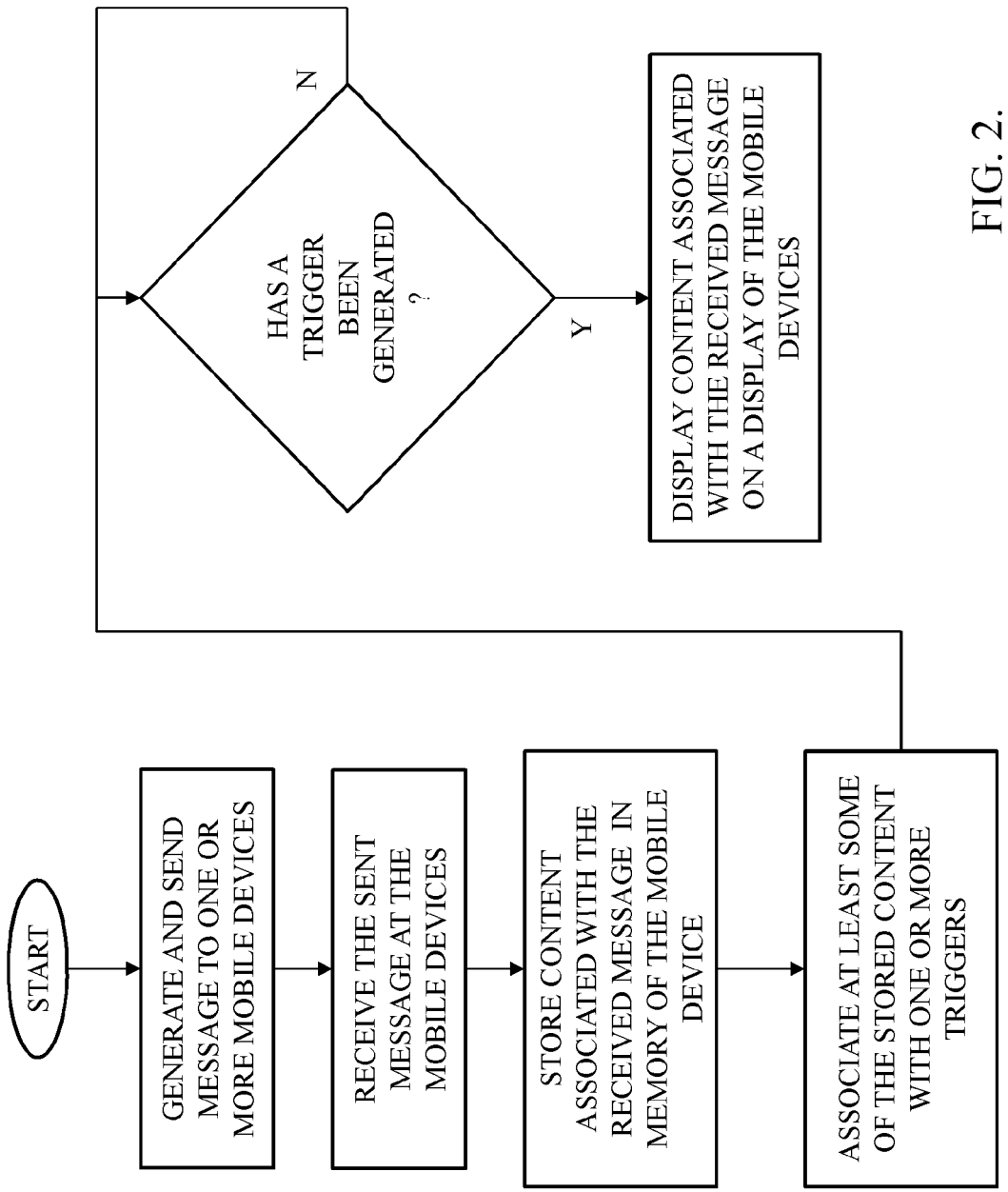
FIG. 2 illustrates a flowchart of an example process performed by the system shown in FIG. 1.

FIG. 1 illustrates an exemplary system 20 for performing improved information delivery to a mobile device(s) 24 having a processor and memory. An application-directed SMS is sent to the mobile device 24, and in response content is downloaded from a content server 28 and stored on the mobile device 24. The content server 28 sends graphical and/or other media content stored in memory 30 to the mobile device 24, either directly or via an SMSC 26, based on the received request. The SMSC 26 generates a short message according to a predefined markup language, such as Handheld Device Markup Language (HDML), or such as a more specialized form of markup language for specifying content for display on mobile devices called Intelligent Display Markup Language (IDML). The short message includes content sent from the content server 28. The short message is sent to the mobile device 24 via the respective carrier (not shown) using SMS.

The system 20 also includes a wireless network 32 that is in communication with the mobile device(s) 24 and with the content server 28 or other content servers 40 via Internet, other public or private networks (not shown) via a wireless network 32. For this purpose, network and data communications to the wireless network 32 can be achieved using network services on established cellular networks (without limitation, networks based on wireless standards such as CDMA, GSM, 3G, 4G and LTE), and may also include network communications via mobile access points for Internet, depending on the specific communications hardware installed in the mobile device.

The predefined markup language is a generalized, extensible markup language (hereinafter "IDML" (Intelligent Display Markup Language)) for creating and displaying promotional content on mobile devices. In one embodiment, an IDML-coded, application-directed SMS (hereinafter "AD-SMS"), which is hidden from the user of the mobile device 24, serves as the trigger to initiate a server message (from the content server to the mobile device) to the mobile handset telling it how to obtain the content of a graphical advertisement. An application-directed SMS is sent from the SMSC 26 to the mobile device 24. The SMS includes, at minimum, a link to the content server 28 having a request for media content (i.e., graphical advertisement and markup language). As an alternative, subscriber SMS may be used to transmit the message to the mobile device 24 as well, provided that the subscriber's SMS client can be instructed not to display the message to the subscriber via the user's inbox, but rather to store the received message for later display. Once delivered to the mobile device as an SMS message, if more content is designated (e.g., by a URL in the message) the mobile device 24 uses the link to obtain additional content from the content server 28.

Storage or memory facilities on the mobile device 24 are used to cache the received IDML content prior to its display on the mobile device 24. The display of the stored advertisement may occur upon generation or detection of an event, condition or rule evaluated on the handset, e.g., an end-of-call event, thus ensuring a user is available for viewing of the displayed content; or a geographic location or movement determined with reference to GPS location supplied by the handset's GPS hardware. Displaying of the message content to the subscriber upon an end-of-call event guarantees subscriber presence to the sender of the message, e.g., an advertiser. After a trigger (e.g., an event, condition or rule detected or evaluated on the handset) is experienced or detected at the mobile device 24, the mobile device 24 displays the content/IDML message stored in the cache on the mobile device and associated with (or alternatively, registered for execution upon) detection of the trigger event or condition.

In one embodiment, the campaign is triggered by means of a Session-Initiation Protocol (SIP) communication rather than application- or port-directed SMS. Another form of trigger could also be a command signal from an application or network session.

Three implementations are considered:

A. Textual content: If the IDML content contains text for display, plus some minor user interface, and thus fits within a 160-character limit, the application located on the mobile device 24 may be executed on a local toolkit on the mobile device 24, without requiring access to the content server 28. No URL or other content download is required. Example: a carrier communication to a subscriber such as minute status, minutes of use to a subscriber, payment due notification, or simple advertising message. Note that this type of simple IDML deployment does not preclude the use of the content server 28 on the network.

B. Graphical content: If the IDML content is all graphical, the use of the content server 28 accessed via the wireless network 32 is preferred. The type of display included in the mobile device 24 is identified and used in a query to the content server 28. Image bits are sent from the content server 28 to the mobile device 24. The graphics associated with the image bits are then displayed for the appropriate resolution and placement on the mobile device's display.

C. Mixed content: If the IDML content is mixed text and graphics, a request for a full set of IDML with text and graphics is sent from the content server 28. For example, an advertisement with the word TOYOTA, a car image, and a "BUY" button. In this case, the IDML file (i.e., SMS message) includes, without limitation: the word TOYOTA as a logo or in an approved text style; an image file, car.jpg; a time and date condition, such as in the form 11:00:00 pm/10-29-2009; a condition setting for launching the message, such as phone-on, call termination, end-of-voice-call, or a specific, designated time or event. The IDML information would be applied on the mobile device 24 to create and display an advertisement/promotion at the designated time or condition, using the designated content.

Without limitation, other triggers that could be applied to launch or to constrain (e.g., set an expiration) on an SMS campaign include events, conditions or rules to be evaluated using the following:

Time & date

Location of the mobile device 24 (within certain specified cell coverage territories or distance of certain GPS coordinates)

Network or web (32, 40) access from the mobile device 24

Identifying the Mobile Directory Number (MDN) of an incoming or outgoing call (e.g., matching Home Depot advertisement to a call to or from a Home Depot 800 number)

MDN of an SMS message (e.g., in a 411 information SMS containing an MDN)

Identifying the caller (e.g., by name, address, location associated with an MDN)

Personalized information associated with an MDN or caller information

Launching a browser URL at the mobile device 24

Storing a number at the mobile device 24

Detection of movement by noting changes in a GPS location or cell coverage territory (e.g., handset is moving on highway 5 in Tacoma, Wash., so find advertisements from the mall off the highway at a specific exit); or within a distance of a specific GPS location or specific mapped item; or detection of movement of the device using hardware-based movement reporting (e.g., acceleration, direction, velocity and distance covered, perhaps providing time to target location).

In one embodiment, the trigger includes information (e.g., name, address/city/state/location/employer) to aid in identifying at least one of the parties included in a call event. The trigger may also include information personalized to at least one of the parties included in a call event. The personalized information may include some unique characteristic(s) based on metadata known about the person involved (i.e., the viewer of the content delivered to the mobile device). Personalization information may include tracking data, such as web history, purchase history, reading history, etc. This allows the addition of content to a page that is directed to the person viewing the content, but not necessarily identifying the viewer.

Note that the sending of the message to the mobile device 24, the retrieval of further content if specified in the message, association of the message with one or more triggers, and display of the content in response to a trigger are asynchronous activities. They may happen in rapid sequence or occur independently, depending on the schedule for provisioning content to the handsets from the network, and depending on triggers arising from actual use of the handset. In another view, a trigger with no content associated with it, or stored content not yet associated with a trigger, are not programmatically bound, so no error condition will occur. There will simply be no available response to that trigger, and no display of stored content, at that time. On certain networks, data and voice activities may occur at the same time (such as GSM networks). On other networks, voice and data activity may not occur at the same time (such as CDMA networks). The present invention does not, however, require that the message or associated content be retrieved during a call, though that may be possible, if appropriate triggers are specified, on those networks in which allow simultaneous voice and data activity on the mobile device. This overcomes the timing and scheduling issues related to SMS message campaigns as presently practiced.

The present invention may also be used to deliver and to update content for software trials on mobile devices. Methods for trial and expiration messaging are described in U.S. patent application Ser. No. 12/191,904 filed Aug. 14, 2008, which is hereby incorporated by reference.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   initiating a network connection communication with a mobile device;
   sending a message to the mobile device over the network connection;
   receiving and storing the sent message and associated content on the mobile device;
   generating a trigger at the mobile device; and
   in response to the generated trigger, displaying content associated with the received message on a display of the mobile device.

2. The method of claim 1, wherein the trigger comprises information personalized to at least one of the parties included in a call event.

3. The method of claim 1, wherein the trigger comprises information identifying at least one of the parties included in a call event.

4. The method of claim 1, wherein displaying occurs in response to a user action.

5. The method of claim 1, wherein displaying occurs during a call.

6. The method of claim 1, wherein displaying occurs at the end of a call.

7. The method of claim 1, further comprising:
   evaluating the message;
   requesting additional content from one or more other network servers; and
   receiving and storing the additional content on the mobile device from the one or more other network servers.

8. The method of claim 1, wherein the message comprises content received from one or more network servers.

9. The method of claim 1, wherein the content comprises at least one of text, graphics, audio, video, a user action, or an interactive user interface object.

10. The method of claim 1, wherein generating the trigger is performed based on at least one of a call initiation event, a received call page event, an end-of-call event, or a call termination event.

11. The method of claim 10, wherein displaying is performed based on at least one of a call initiation event, a call page event, or an inbound call termination event.

12. The method of claim 1, further comprising sending the message to the one or more mobile devices using at least one of a short message service (SMS), a port-directed or application-directed SMS, MMS, or a session initiated protocol (SIP).

13. The method of claim 1, wherein receiving comprises receiving the message using at least one of a short message service (SMS), a port-directed or application-directed SMS, MMS, or session-initiated protocol (SIP).

14. The method of claim 1, further comprising storing information associated with the displayed content upon receipt of the message.

15. The method of claim 14, wherein the information comprises a Mobile Directory Number associated with a call initiation event.

16. The method of claim 15, wherein initiating the action comprises at least one of launching a web browser, displaying additional content, calling a number associated with the displayed content, or initiating one or more of a registration, subscription, or purchase process.

17. The method of claim 1, further comprising:
   generating a command signal upon receipt of a user action related to the displayed content; and
   initiating an action based on the received command signal.

18. A system comprising:
   a means for sending a message to a mobile device from a network server;
   a means for receiving the message at the mobile device;
   a means for storing content associated with the received message on the mobile device;
   a means for detecting a trigger at a mobile device; and a means for displaying stored content on a display of the mobile device in response to the detected trigger.

19. The system of claim 18, wherein the means for displaying displays in response to trigger comprised of at least one of a user action, during a call, or at the end of a call.

20. The system of claim 18, further comprising a means for generating the trigger based on at least one of a call initiation event, receive call page event, end-of-call event, or a call termination event, and wherein the means for displaying is performed based on at least one of a call initiation event, a call page event, or an inbound call termination event, the means for sending sends the trigger using at least one of a short message service (SMS), a port-directed or application-directed SMS, MMS, or a session-initiated protocol (SIP), and the means for receiving receives the message using at least one of a short message service (SMS), a port-directed or application-directed SMS, MMS, or session-initiated protocol (SIP).

21. The method of claim 1, wherein the network connection is established over a cellular network based on at least one of the CDMA, GSM, 3G, 4G or LTE wireless standards.

22. The system of claim 18, wherein the means for sending a message to a mobile device from a network server uses a network connection based on at least one of the CDMA, GSM, 3G, 4G or LTE wireless standards.

* * * * *